Aug. 2, 1949.　　　A. G. LIEBMANN　　　2,477,632
EXCREMENT INCINERATOR
Filed Feb. 20, 1945　　　　　　　　　5 Sheets-Sheet 1
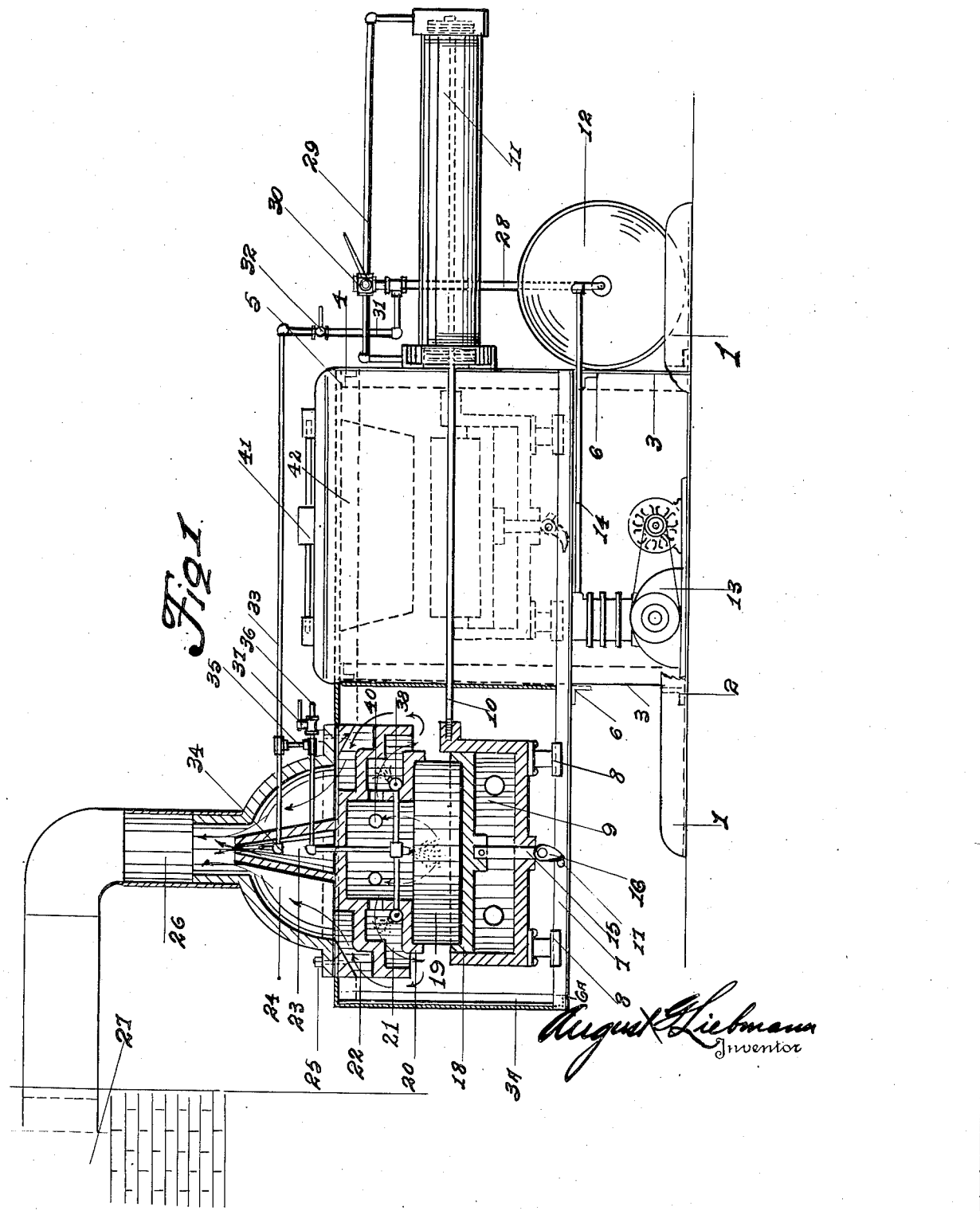

Aug. 2, 1949.  A. G. LIEBMANN  2,477,632
EXCREMENT INCINERATOR
Filed Feb. 20, 1945  5 Sheets-Sheet 2
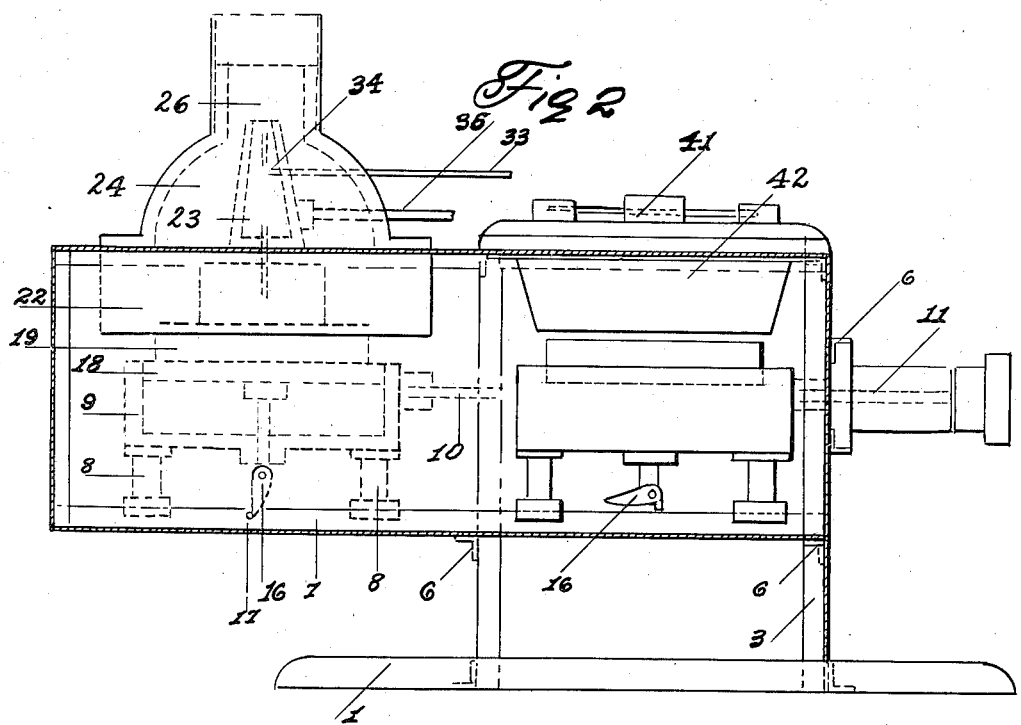
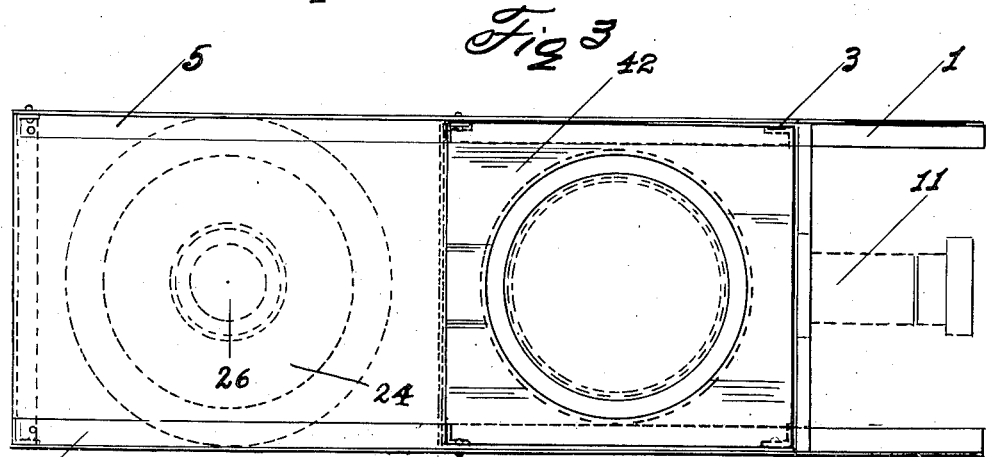
August Liebmann
Inventor Aug. 2, 1949.  A. G. LIEBMANN  2,477,632
EXCREMENT INCINERATOR
Filed Feb. 20, 1945  5 Sheets-Sheet 3
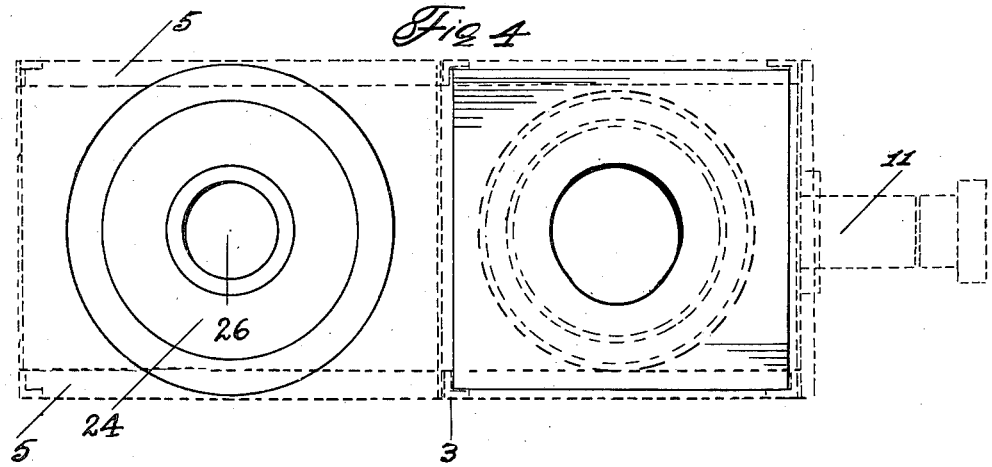
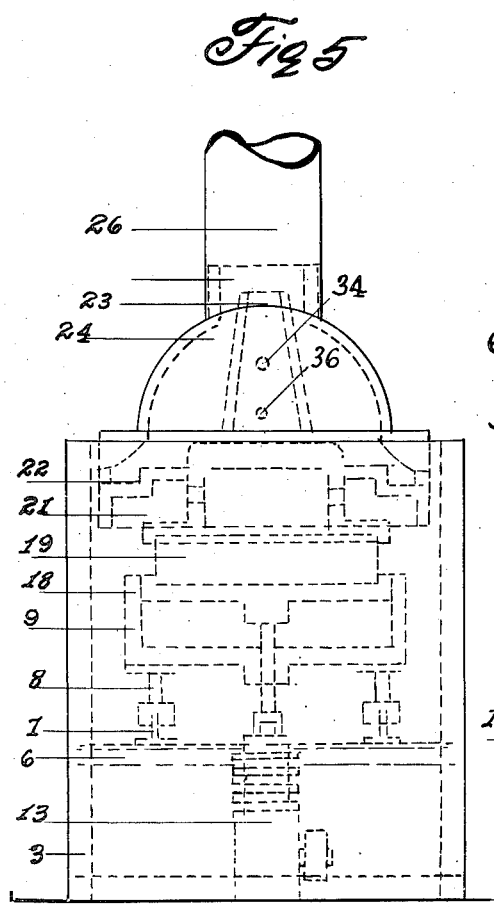
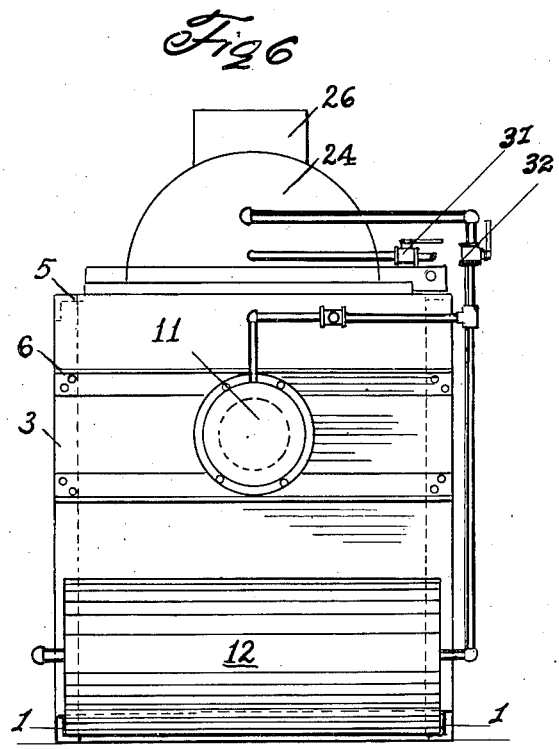
August Liebmann, Inventor

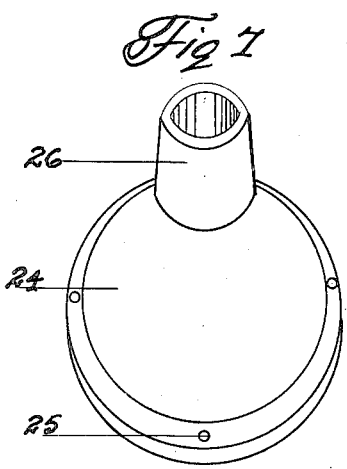
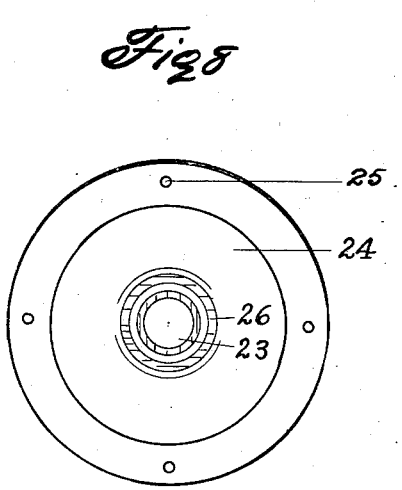
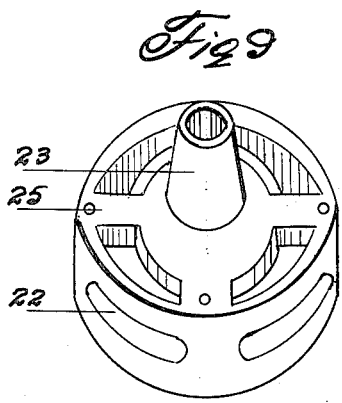
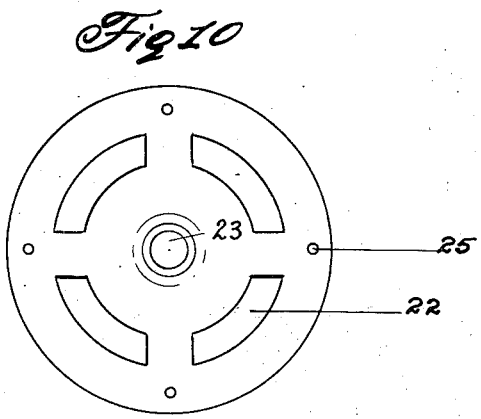
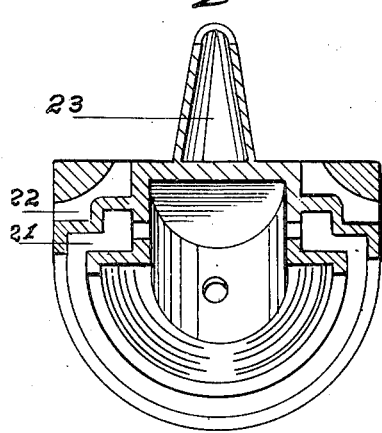
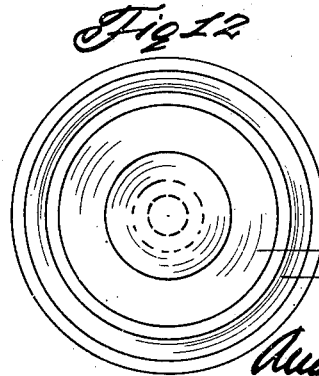

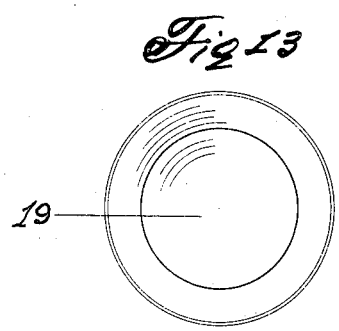
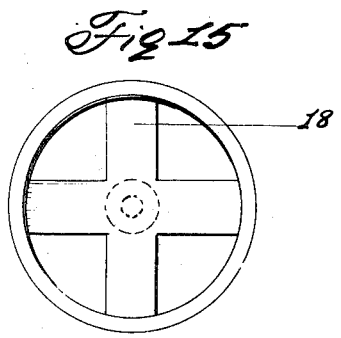
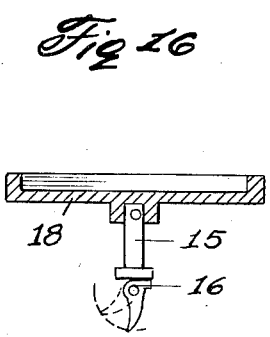
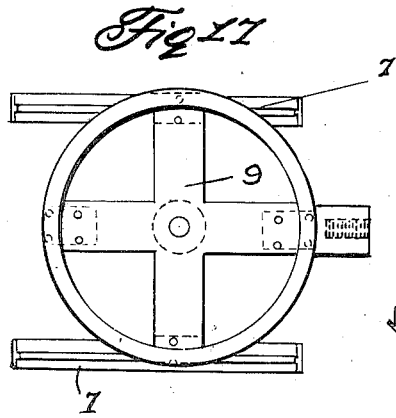
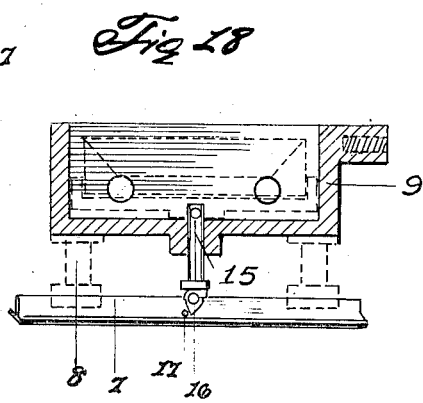

Patented Aug. 2, 1949

2,477,632

UNITED STATES PATENT OFFICE 2,477,632

EXCREMENT INCINERATOR

August G. Liebmann, Washington, D. C., assignor of one-half to Harry A. Blessing, Washington, D. C.

Application February 20, 1945, Serial No. 578,856

9 Claims. (Cl. 110—9)

The present invention relates to excrement incinerators, and more particularly to the portable, or semi-portable, self-contained unit type.

The primary object of the present invention is to provide an apparatus, simple effective and economical for the disposal of excrement as instantaneously as possible.

A further object is to provide means and methods of accomplishing such result, by the adaptation of high velocity evaporation, simulating vacuum evaporation, and drawing the fumes therefrom through a curtain of live flame to destroy all odors incidental to such operations.

The fundamental principles involved as disclosed with the present apparatus may be applied to other types such as aeroplanes, railway carriages, omnibuses, and the like, the design of the invention applicable to the present, is useful for dwellings, city, surburban homes, farms etc.

Statistics have disclosed an appalling lack of sanitary conditions even in areas susceptible to plumbing, and therefore the object in general of the present invention is to correct such anomalous unsanitary conditions in places where they are not supposed to exist.

Reference being had to the accompanying drawings describing the invention:

Figure 1 is a side elevation of the unit.

Figure 2 is an outline of the same side elevation.

Figure 3 is a top plan of the base of the frame.

Figure 4 is a top plan showing the relative position of the deposit compartment and the retort compartment;

Figure 5 is an end elevation of the apparatus, showing the carrier and retort section in broken lines;

Figure 6 is an end elevation of the deposit section showing the fluid pressure receiver and the air cylinder, for shifting the carrier into and out of incineration position;

Figure 7 is a perspective view of the upper section of the retort;

Figure 8 is a top plan view of the upper section of the retort;

Figure 9 is a perspective view of the ejector or lower section of the retort;

Figure 10 is a top plan view of the same, or ejector section of retort;

Figure 11 is a fragmentary view of the lower, or ejector section of the retort in cross section on its central axis and laid on its side;

Figure 12 is a bottom plan view of the ejector section of the retort; the upper section of the retort shown in Figures 7 and 8, and the lower of ejector sections of the retort shown in Figures 9, 10, 11, 12 may be constructed by moulding from suitable clays or other refractories well known in the metallurgical or pyrometallurgical arts;

Figure 13 is the receptacle made from unfired clays of suitable texture, and absorbent qualities, which by the well known method of cupellation, absorbs certain residues into the walls, which in time renders the same saturated and glazed, whereupon it is replaced;

Figure 14 is a cross section of Figure 13 at its axis, diametrically;

Figure 15 is a top plan view of the cradle that carries the receptacle as shown in Figures 13 and 14;

Figure 16 is a cross section of the cradle, taken on its central axis; showing the hinged lift rod and pawl depending therefrom for raising and lowering the cradle and receptacle;

Figure 17 is a top plan view of the carrier, which is slidably mounted on rails by means of shoes fixed to the bottom of the carrier ring;

Figure 18 is a cross section of the carrier, showing the cradle and receptacle in broken lines with incidental relationship; and the carrier shoes with respect to the carrier and the rails which support it for slidable movement.

Reference now being had to the numerals, the base 1 of suitable structural shape, is in effect the bed plate, secured thereto are the structural shapes 2 and mounted in relation thereto are the stanchions 3 comprising the vertical members to form a box like structure for the deposit compartment; at the top of the members 3, transverse structural members are secured and interlocked to the longitudinals the same shown in broken lines and designated by the numerals 4 and 5 respectively. Transverse members 6 are secured to the stanchions 3 as illustrated in the dotted lines connecting the deposit compartment with the retort compartment designated 5 at the upper end of the said Figure 1 but not shown in the lower part thereof; the rails 7, are supported by the aforesaid transverse members 6 and 6A; the rails extend longitudinally within the box like structure of the deposit compartment and beyond the same in cantilever form within the retort compartment and the rails 7; provide sliding and supporting surfaces; for the shoes 8 which support the carrier 9, the same being mounted for slidable movement back and forth between the said compartments by means of the piston rod 10; working in a cylinder 11 and activated by fluid pressure from the main reservoir 12 supplied with fluid under pressure from the motor-compressor unit 13 by way of the feed pipe 14, the operation of which will hereinafter be fully described.

The carrier 9 is provided with a concentric bore adapted to guide a lift rod 15; having a pawl 16 at its lower end, which causes the rod 15 to be pushed up when the pawl 16 comes in contact with a catch pin 17; the opposite end of the lift rod 15 is connected to the cradle 18; which carries the receptacle 19; for up and down movement to interlock the receptacle within the flanged abutment 20 of the retort, the operation of which will be hereinafter fully described.

The retort is provided with primary ducts 21, and secondary ducts 22, and a blast nozzle 23 cast integrally of a suitable refractory material and capped by a dome 24 also of suitable refractory material, the operation of which will hereinafter be more fully described.

The upper section of the retort 24 is bolted to the lower or ejector section 22 by means of stud bolts 25; thus the two parts united make the complete retort with ducts and blast nozzle and dome as noted; the dome 24 is connected to a vent pipe 26 for exhaust of fumes to the atmosphere, through an ordinary flue 27, such as is commonly used for smoke conductors in dwellings.

The dome section 24 of the retort is supported on the upper surface of the box-like structure and the lower or ejector section with blast nozzle 23 and ducts 21 and 22 and flanged abutments are held in suspension therein.

The fluid pressure pipe 28 is connected to the reservoir 12 and the cylinder feed pipe 29 is connected at opposite ends of the cylinder 11 and the piston 10 is made to reciprocate by means of the 4 way clock 30, admitting fluid under pressure at one end and exhausting the trapped air from the opposite end to the atmosphere as the clock 30 is manipulated. Thus the piston 10 is caused to move to or fro in the cylinder 11 to move the carrier 9 and its assemblage.

The branch pipe 31, connected to the main pipe 28, conducts fluid under pressure to the blast nozzle 23 and when the valve 32 is opened air flows through the branch pipe 33 and through the exhaust nozzle 34 within the blast nozzle 23; the end of pipe 36 is connected to a supply of gas and controlled by the valve or cock 37 to supply the burner system 38; it will be noted that a branch pipe 35 of the fluid pressure line is coupled to the gas line to force the gas to burner system under pressure, thereby increasing the efficiency of combustion.

The burner system projects live flame into the receptacle 19; fumes from which pass through the apertures 40 and by reason of the exhaust of air through the blast nozzle, due to jet 34; and blast nozzle 23, thus creating a strong suction and down draft of fumes through the primary ducts 21 and secondary ducts 22 it will be noted that fumes passing through the apertures 40 pass through the flames of the burner 38, in the primary ducts 21, thus burning out all odors which are being sucked through the secondary ducts 22 for exhaustion through the dome 24; and the channels or pipes 26 to the flue 27, thence to the atmosphere as ordinary smoke.

The hinged cover 41 of the deposit compartment, may be provided with a felt or rubber strip, to make it air tight; thus when the apparatus is being exhausted it is held secure by suction of atmosphere, the air being less dense on the inner than on the outer side of the cover, the same is automatically locked during the exhaustion or incineration stage.

The petticoat pipe, or fender is designated 42.

The petticoat pipe or fender 42, is shown in plan in Fig. 3 and is made of thin sheet metal, a flat plate with the frustro-conical extension, that insures deposit in the receptacle; it is removable for scrubbing and cleaning, and to insure sanitary results.

The present invention is manually controlled by the valves as noted, but I do not limit myself to the same and may use thermostatic and automatic controls in connection with the apparatus.

The motor compressor and fluid pressure operation may be provided with automatic control to keep the air or other fluid at constant temperature and pressure in the reservoir 12; in ordinary operation the deposit is made with the apparatus as shown in the dotted lines, and immediately the gas is opened along with the blower by means of the valves 32 and 37; a pilot light of the conventional variety or any other form of automatic ignition may be used to ignite the gas and as the valve 30 is adjusted the piston rod 10 moves the carrier 9 and shifts the receptacle 19 into position of exhaustion as shown in the cross section of the retort in Figure 1.

The time required for evaporation and incineration and deodorization of fumes is very short, and the gas is turned off at the valve 37; and the blast nozzle allowed to flow to scavange all vagrant gases or odors, during inspection; if and when the receptacle is dry and the contents being no more than dust, then the fluid pressure valve 32 is closed and the apparatus is ready for the next cycle of use.

In course of time the receptacle must be replaced; but as they are made of porous absorptive clays, they are cheap and expendable.

It will be noted in the operation, that after the excrement is deposited in the receptacle 19, which is carried by the cradle 18, as shown in detail in Figure 16; the assemblage is then moved by a fluid pressure means for engagement with the retort abutments 20; the cradle 18 mounted in the carrier 9, is elevated by the rod 15 and the pawl 16; which engages with a stop 17, fixed to the sliding rail 7 as shown in Figure 17; wherein two rails are shown; in most cases of construction only one centrally located; being absolutely necessary.

The numeral 38 indicates an annular conduit disposed within the channel 21 of the retort; and connected by a branch pipe and burner, these burners, like a blow-torch action, feed the fuel under pneumatic pressure, to insure combustion, as previously described.

Having thus described my invention, what I claim as new is as follows:

1. An excrement incinerator, having a deposit compartment and a retort compartment operatively associated with each other, a receptacle unit mounted for movement between the said compartments and adapted to receive a content of excrement in the deposit compartment and the content of excrement to be volatilized in the retort compartment and a piston and cylinder fluid pressure means adapted to shift the receptacle between the compartments and means to eject the volatilized contents from the retort compartment.

2. An excrement incinerator, having dual compartments, one of said compartments having a fixed means therein, means mounted for slidable movement by fluid pressure means in order to effect an interchangeable movement with respect to the compartments; a receptacle unit carried by the slidably mounted means; means upon the receptacle unit adapted to coact with said fixed means below said receptacle unit for elevating the unit in one of the compartments, and allowing it to be lowered by gravity to a lower level when withdrawn from the said compartment for its return upon the lower level to the other compartment.

3. An excrement incinerator, having a deposit compartment and a retort compartment in a common unit, a movably mounted receptacle unit adapted to receive a content of excrement in the deposit compartment, fluid pressure means operatively associated with the receptacle for shifting the receptacle from the deposit compartment to the retort compartment and a heating means within the retort compartment and in operative relation to the receptacle to rapidly volatilize the content of the receptacle and means to conduct such ejected volatilized contents to the atmosphere.

4. An excrement incinerator, comprising a retort compartment, a retort means disposed within said retort compartment; provided with forced draft channels and an exhaust dome in intercommunicating relationship with the said channels; a blast nozzle disposed concentric to the dome and channels; fluid pressure means for charging the blast nozzle to eject the gases from the channels through the dome, means for heating the retort means and a pipe to conduct such ejected gases to the atmosphere.

5. An excrement incinerator, having dual compartments having a guide means therein; a cradle means slidably mounted upon said guides for interchange of position between the compartments; a receptacle mounted on said cradle means, a retort means in one of the compartments, means coacting with the cradle means and guides for elevating the receptacle to thereby engage by interfitting relationship with the retort means when the receptacle unit is elevated.

6. An excrement incinerator of the self contained type, having a deposit compartment and a retort compartment, guides connecting the compartments, a receptacle means mounted for slidable movement upon the guides for interchange of the receptacle between the compartments and a fluid pressure means operatively associated with the receptacle means for actuating the slidable movement to effect the interchange between the compartments.

7. An excrement incinerator having a retort compartment, a retort means mounted therein, comprised of a dome section having an ejector section; means forming channels in the ejector section; means for heating the channels, a blast nozzle integral with the ejector section and disposed concentrically to the retort channels of the ejector section; the dome disposed concentrically to said sections; means for discharging fluid pressure through the blast nozzle; control means for said pressure means to pass fluid pressure through the blast nozzle, whereby the same exhausts and ejects the contents of the heated channels through the dome.

8. In an excrement incinerator provided with compartments, one of said compartments comprising a retort compartment, a carrier supported for travel between the compartments; fluid pressure means for imparting travel to the carrier, a receptacle holder disposed upon the carrier, a receptacle carried by the holder, a hoisting means for the said holder and means thereon to vertically elevate said receptacle with respect to the said carrier.

9. In an excrement incinerator, compartments, a receptacle carrier supported for travel between the compartments; fluid pressure means including a cylinder and piston coacting with the receptacle carrier and receptacle therein to position the same in one compartment to accumulate a charge of excrement to be handled; a retort in the other compartment, the receptacle carrier and receptacle adapted to be moved into alignment with the retort in its respective compartment; means on the receptacle carrier and retort compartment to position the receptacle into and out of interfitting relationship and engagement with the retort; incinerating means to vaporize the excrement accumulation within the receptacle and means within the retort to eject the vapors through a conductor means to the atmosphere.

AUGUST G. LIEBMANN.

REFERENCES CITED

The following references are of record in the file of this patent:

UNITED STATES PATENTS

| Number | Name | Date |
|---|---|---|
| 464,814 | Condit | Dec. 8, 1891 |
| 677,141 | Rice | June 25, 1901 |

Certificate of Correction

Patent No. 2,477,632.

August 2, 1949.

AUGUST G. LIEBMANN

It is hereby certified that errors appear in the printed specification of the above numbered patent requiring correction as follows:

Column 3, lines 39 and 41 respectively, for "clock 30" read *cock 30*; and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*